(12) United States Patent
Chen

(10) Patent No.: US 6,170,357 B1
(45) Date of Patent: Jan. 9, 2001

(54) BICYCLE PEDAL ASSEMBLY

(76) Inventor: Chung-I Chen, No. 3, Kung-Chi Rd., Yu-Ssi-Kung-Yeh Dist., Ta-Chia Chen, Taichung Hsien (TW)

( * ) Notice: Under 35 U.S.C. 154(b), the term of this patent shall be extended for 0 days.

(21) Appl. No.: 09/244,964

(22) Filed: Feb. 5, 1999

Related U.S. Application Data

(63) Continuation-in-part of application No. 09/187,937, filed on Nov. 6, 1998, now Pat. No. 6,112,620.

(51) Int. Cl.[7] ........................................... G05G 1/14
(52) U.S. Cl. ........................................ 74/594.6; 74/594.4
(58) Field of Search ........................... 74/594.4, 594.6; 36/131, 132

(56) References Cited

U.S. PATENT DOCUMENTS

| | | | | |
|---|---|---|---|---|
| 5,003,841 | * | 4/1991 | Nagano | 74/594.4 |
| 5,203,229 | * | 4/1993 | Chen | 74/594.4 |
| 5,557,985 | * | 9/1996 | Nagano | 74/597.6 |
| 5,685,202 | * | 11/1997 | Chen | 74/594.6 |
| 5,755,144 | * | 5/1998 | Ueda | 74/594.6 |
| 5,787,764 | * | 8/1998 | Peyre | 74/594.4 |

* cited by examiner

Primary Examiner—David Fenstermacher
Assistant Examiner—Chong H. Kim
(74) Attorney, Agent, or Firm—Fish & Richardson P.C.

(57) ABSTRACT

A pedal assembly includes a pedal body having a tubular portion for mounting rotatably on a bicycle pedal shaft around an axis, front and rear end walls in a longitudinal direction parallel to the axis, and right and left pairs of front and rear lateral walls that extend respectively from the end walls in a first transverse direction to form rightmost and leftmost pairs of front and rear end portions. Two forward and rearward anchor members are respectively mounted between the rightmost front and rear end portions in the longitudinal direction and proximate to upper surfaces of the lateral walls, and between the leftmost front and rear end portions in the longitudinal direction and proximate to lower surfaces of the lateral walls, such that the forward and rearward anchor members are in symmetry relative to the first axis. Two force adjusting members are disposed between the left and right pairs of lateral walls in the longitudinal direction and proximate to the upper and lower surfaces thereof. Each of two coil springs has a first end that urges a respective rearward anchor member toward a corresponding forward anchor member, and a second end 52 that urges a respective adjusting member toward the tubular portion in the first transverse direction.

3 Claims, 6 Drawing Sheets

BICYCLE PEDAL ASSEMBLY

CROSS-REFERENCE OF RELATED APPLICATION

This invention is a Continuation-in-Part of U.S. patent application Ser. No. 09/187,937, which was filed on Nov. 6, 1998, now U.S. Pat. No. 6,112,620.

BACKGROUND OF THE INVENTION

1. Field of the Invention

The invention relates to a pedal assembly, more particularly to a bicycle pedal assembly.

2. Description of the Related Art

A conventional bicycle pedal assembly is adapted to be mounted on a bicycle pedal shaft for engaging a cleat unit which has forward and rearward ends and which is fixed to a bottom surface of a sole of a cyclist's shoe.

Referring to FIGS. 1 and 2, the conventional bicycle pedal assembly 10 is shown to include a rectangular pedal body 11 having front and rear portions 11F, 11R, and a central tubular portion 13 adapted to be mounted on the bicycle pedal shaft (not shown) around a first axis. The tubular portion 13 extends in a longitudinal direction parallel to the first axis in order to define front and rear accommodating spaces 12 at front and rear sides of the tubular portion 13. The pedal body 11 has upper and lower surfaces 11U, 11L opposite to each other in a transverse direction relative to the longitudinal direction. Two forward anchor members 26, in the form of elongate plates, are mounted transversely on the upper and lower surfaces of the tubular portion 13 in such a manner that the forward anchor members 26 are in symmetry relative to the first axis. Two rearward anchor members 22 are mounted in the front and rear accommodating spaces 12 respectively by means of two axles 23 that extend in the longitudinal direction in such a manner that the rearward anchor members 22 are in symmetry relative to the first axis. Each of the rearward anchor members 22 has a grip portion 22G disposed to be brought toward a respective one of the forward anchor members 26 and adapted to clamp the cleat unit 31 (see FIG. 3) in a transverse direction relative to the longitudinal direction in cooperation with the respective forward anchor member 26. Two units of biasing members 21 are sleeved around the axles 23 to bias the rearward anchor members 22 respectively so as to urge the grip portions 22G to move toward the forward anchor members 26.

A disadvantage of the conventional pedal assembly resides in that the forward anchor members 26 are in the form of elongate plates, and have lateral arms 261 that extend in the longitudinal direction and that cover the front and rear accommodating spaces 12 such that once the cleat unit 31 is engaged by the forward and rearward anchor members 26, 22, dirt that attaches thereto cannot drop through the front and rear accommodating spaces 12.

SUMMARY OF THE INVENTION

Therefore, the object of this invention is to provide a bicycle pedal assembly that is adapted to be mounted on a bicycle pedal shaft and that can overcome the aforementioned disadvantage that is associated with the conventional bicycle pedal assembly.

Accordingly, the bicycle pedal assembly of this invention is adapted to be mounted on a bicycle pedal shaft for engaging a cleat unit which has forward and rearward ends and which is fixed to a bottom surface of a sole of a cyclist's shoe. The bicycle pedal assembly includes a one-piece pedal body, two forward anchor members, two rearward anchor members, two biasing force adjusting members, two adjustment bolts, and left and right coil springs. The one-piece pedal body includes a tubular portion that is adapted to be mounted rotatably on the bicycle pedal shaft around a first axis, and that has front and rear end walls in a longitudinal direction parallel to the first axis, right and left pairs of front and rear lateral walls which extend respectively from the front and rear end walls rightward and leftward in a first transverse direction relative to the longitudinal direction to form rightmost and leftmost pairs of front and rear end portions, respectively. Each of the lateral walls has upper and lower surfaces opposite to each other in a second transverse direction relative to both the first transverse and longitudinal directions. The forward anchor members are respectively mounted between the rightmost front and rear end portions in the longitudinal direction and proximate to the upper surfaces thereof, and between the leftmost front and rear end portions in the longitudinal direction and proximate to the lower surfaces thereof such that the forward anchor members are in symmetry relative to the first axis. The rearward anchor members are respectively mounted between the leftmost front and rear end portions in the longitudinal direction and proximate to the upper surfaces thereof, and between the rightmost front and rear end portions in the longitudinal direction and proximate to the lower surfaces thereof such that the rearward anchor members are in symmetry relative to the first axis. The biasing force adjusting members are respectively disposed between the right pair of front and rear lateral walls in the longitudinal direction and proximate to the upper surfaces thereof, and between the left pair of front and rear lateral walls in the longitudinal direction and proximate to the lower surfaces thereof and inboard to the forward anchor members, respectively. The adjustment bolts are inserted threadedly in the first transverse direction through the forward anchor members and are fastened threadedly to the biasing force adjusting members. Each of the rearward anchor members further includes a grip portion which projects uprightly to an elevation beyond one of the upper and lower surfaces, a spring rest member spaced from the grip portion, and an axle mounted between respective ones of the left and right pairs of front and rear lateral walls in the longitudinal direction for pivotally mounting the grip portion thereon such that the axle is disposed proximate to a respective one of the biasing force adjusting members. The left and right coil springs are sleeved around the axles of the rearward anchor members respectively and are spaced from the tubular portion in the first transverse direction. Each of the coil springs has a first end that urges the spring rest member of a respective one of the rearward anchor members to move the grip portion toward a corresponding one of the forward anchor members so as to be adapted to clamp the cleat unit in the first transverse direction in cooperation with the corresponding one of the forward anchor members. A second end of each of the coil springs urges a respective one of the biasing force adjusting members in the first transverse direction toward the tubular portion such that rotation of the adjustment bolts relative to the biasing force adjusting members will vary a distance therebetween, thereby resulting in variable biasing force of the coil springs.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

The preferred embodiment of a bicycle pedal assembly according to this inventions is adapted to be mounted on a bicycle pedal shaft and is adapted to engage a cleat unit (not shown) which has forward and rearward ends and which is fixed to a bottom surface of a sole of a cyclist's shoe.

Figure 1:
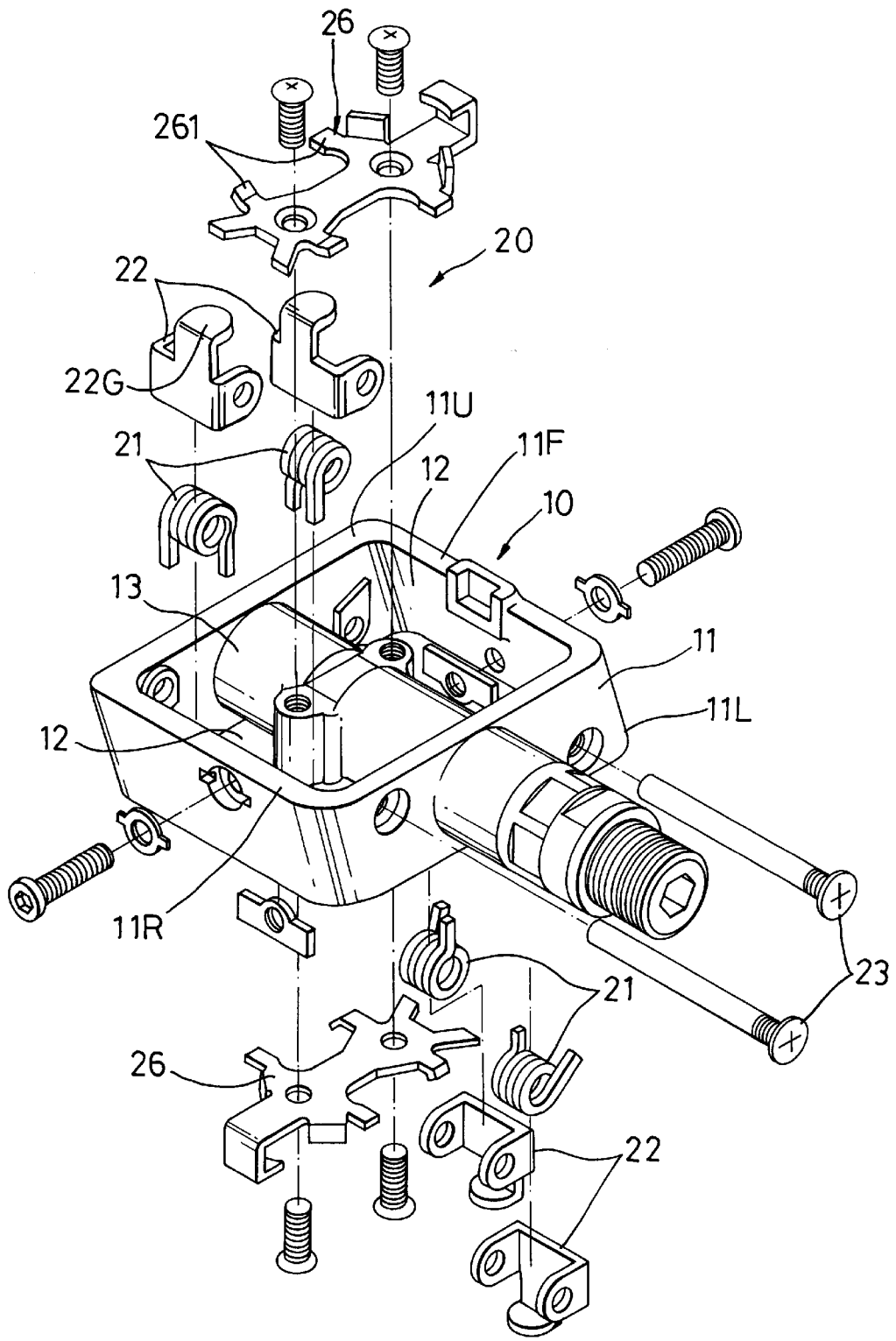
FIG. 1 is an exploded view of a conventional bicycle pedal assembly.
Figure 2:
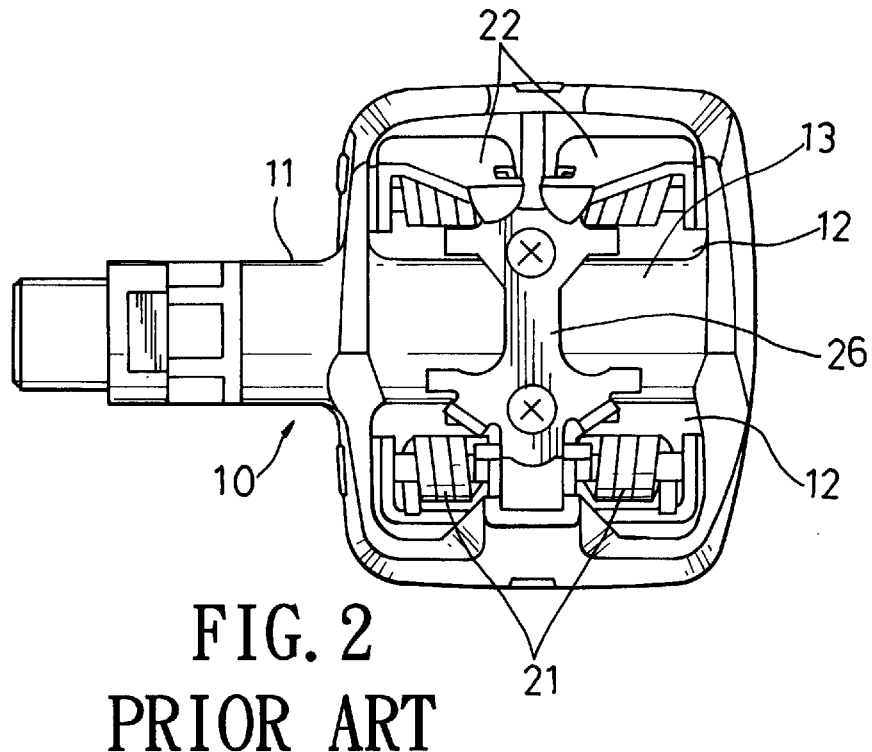
FIG. 2 is a top view of the conventional bicycle pedal assembly.
Figure 3:
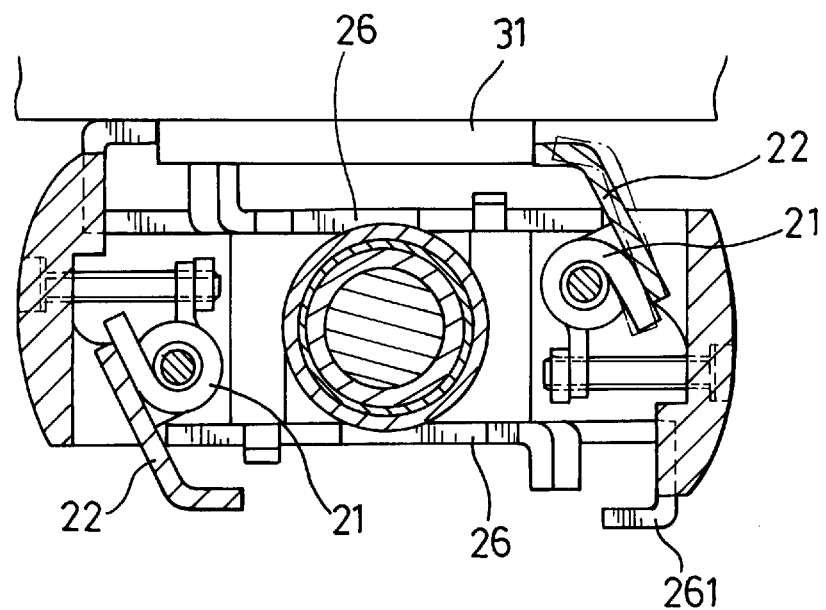
FIG. 3 illustrates how the conventional bicycle pedal assembly engages a cleat unit that is fixed to a sole of a cyclist's shoe.
Figure 4:
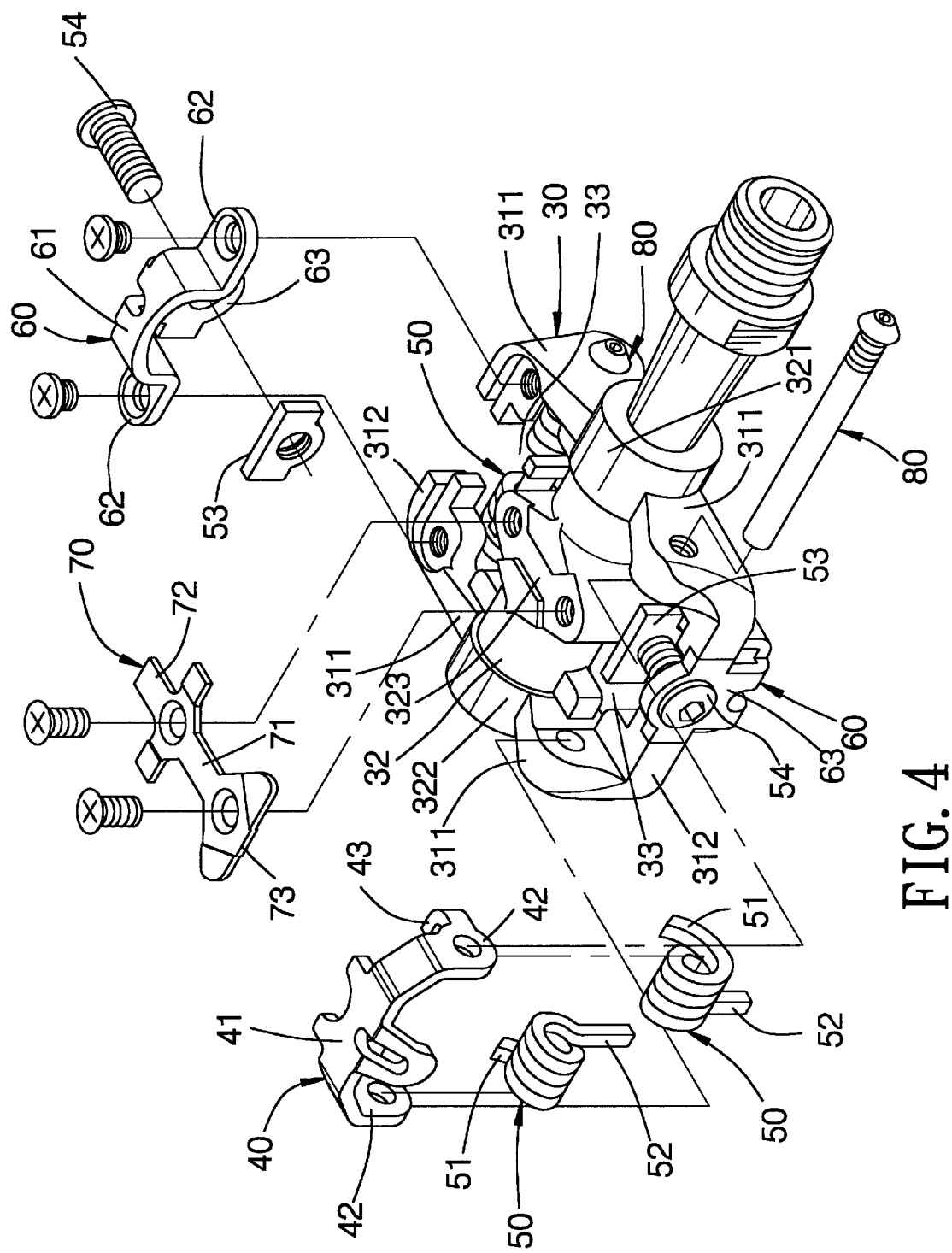
FIG. 4 is an exploded perspective view of a preferred embodiment of a bicycle pedal assembly according to this invention.
Figure 5:
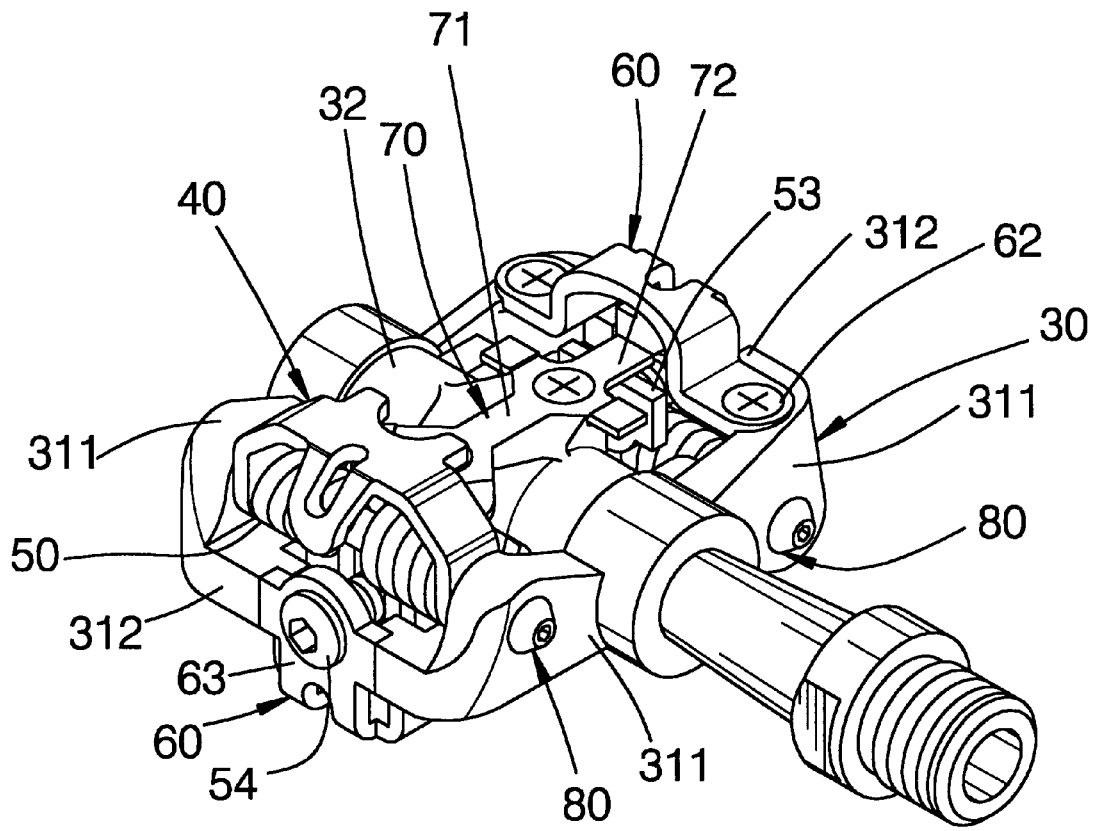
FIG. 5 is an assembled perspective view of the preferred embodiment.
Figure 6:
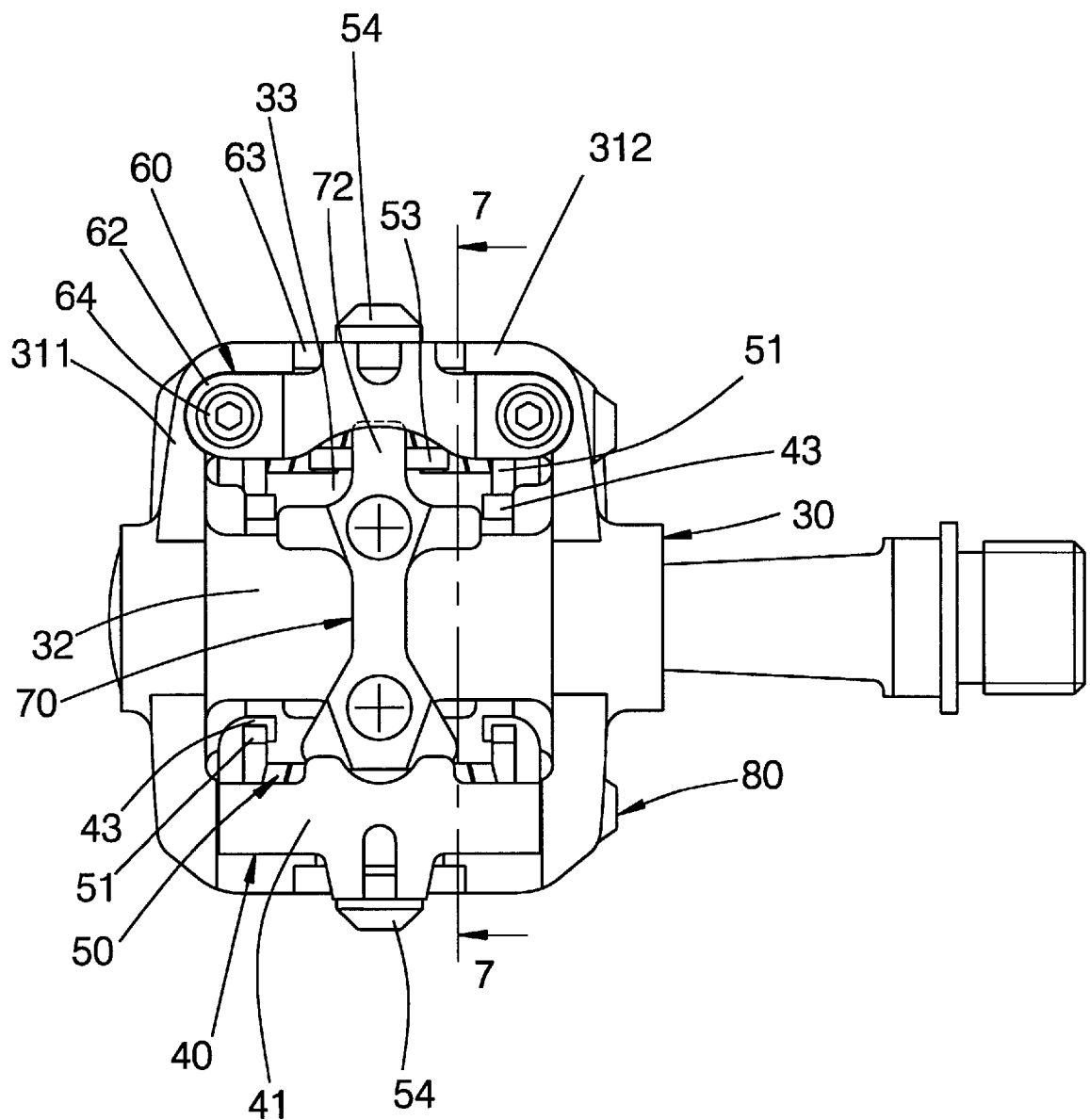
FIG. 6 is a top plan view of the preferred embodiment.

Referring to FIGS. 4, 5 and 6, the preferred embodiment includes a one-piece pedal body 30, two forward anchor members 60, two rearward anchor members 40, two biasing force adjusting members 53, two adjustment bolts 54, and left and right coil springs 50.

As illustrated, the pedal body 30 includes a tubular portion 32 adapted to be mounted rotatably on the bicycle pedal shaft (not shown) around a first axis, and has front and rear end walls 321, 322 in a longitudinal direction parallel to the first axis, and right and left pairs of front and rear lateral walls 311 which extend respectively from the front and rear end walls 321, 322 rightward and leftward in a first transverse direction relative to the longitudinal direction to form rightmost and leftmost pairs of front and rear end portions 312, respectively. Each of the lateral walls 311 has upper and lower surfaces opposite to each other in a second transverse direction relative to both the first transverse and longitudinal directions.

The forward anchor members 60 are respectively mounted between the rightmost front and rear end portions 312 in the longitudinal direction and proximate to the upper surfaces thereof, and between the leftmost front and rear end portions 312 in the longitudinal direction and proximate to the lower surfaces thereof such that the forward anchor members 60 are in symmetry relative to the first axis. The rearward anchor members 40 are respectively mounted between the leftmost front and rear end portions 312 in the longitudinal direction and proximate to the upper surfaces thereof, and between the rightmost front and rear end portions 312 in the longitudinal direction and proximate to the lower surfaces thereof such that the rearward anchor members 40 are in symmetry relative to the first axis.

The biasing force adjusting members 53, in the form of elongated plates, are respectively disposed between the right pair of front and rear lateral walls 311 in the longitudinal direction and proximate to the upper surfaces thereof, and between the left pair of front and rear lateral walls 311 in the longitudinal direction and proximate to the lower surfaces thereof and inboard to the forward anchor members 60, respectively.

The adjustment bolts 54 are threadedly inserted in said first transverse direction through two mounting walls 63 of the forward anchor members 60 and are fastened threadedly to the biasing force adjusting members 53.

Each of the rearward anchor members 40 includes two opposite lugs 42, a grip portion 41 that projects uprightly from the lugs 42 to an elevation beyond one of the upper and lower surfaces, a spring rest member 43 spaced from the grip portion 41, and an axle 80 which extends through the lugs 42 and which is mounted between respective ones of the left and right pairs of front and rear lateral walls 311 in the longitudinal direction for mounting the grip portion 41 pivotally thereon such that the axle 80 is disposed proximate to a respective one of the biasing force adjusting members 53.

The coil springs 50 are sleeved around the axles 80 of the rearward anchor members 40 respectively, and are spaced from the tubular portion 32 in the first transverse direction. Each of the coil springs 50 has a first end 51 urging the spring rest member 43 of a respective one of the rearward anchor members 40 to move the grip portion 41 toward a corresponding one of the forward anchor members 60 so as to be adapted to clamp the cleat unit (not shown) in the first transverse direction in cooperation with the corresponding forward anchor member 60. A second end 52 of each of the coil springs 50 urges a respective one of the biasing force adjusting members 53 in the first transverse direction toward the tubular portion 32 such that rotation of the adjustment bolts 54 relative the biasing force adjusting members 53 will vary a distance therebetween, thereby resulting in variable biasing force of the coil springs 50.

The preferred embodiment further includes upper and lower restriction members 70 disposed on upper and lower surfaces of the tubular portion 32 in the first transverse direction. Each of the restriction members 70 has an intermediate portion 71 disposed securely on the tubular portion 32, and left and right ends 72, 73 that project leftward and rightward from the intermediate portion 71 and beyond the tubular portion 32 to depress the biasing force adjusting members 53, thereby restricting the latter from rotating concurrently with the adjustment bolts 54. Preferably, the tubular portion 32 is formed with upper and lower accommodating recess 323 for receiving the intermediate portions 71 of the upper and lower restriction members 70. Each of the forward anchor members 60 has two lug portions 62 in the longitudinal direction and mounted securely on one of the upper and lower surfaces of a respective one of the leftmost and rightmost pairs of the front and rear end portion 312, and an intermediate portion 61 which is interposed between the lug portion 62 and which projects uprightly from the lug portions 62 to an elevation beyond the respective one of the upper and lower surfaces so as to confine an accommodating space to be inserted and anchored therein by the forward end of the cleat unit.

Figure 7:
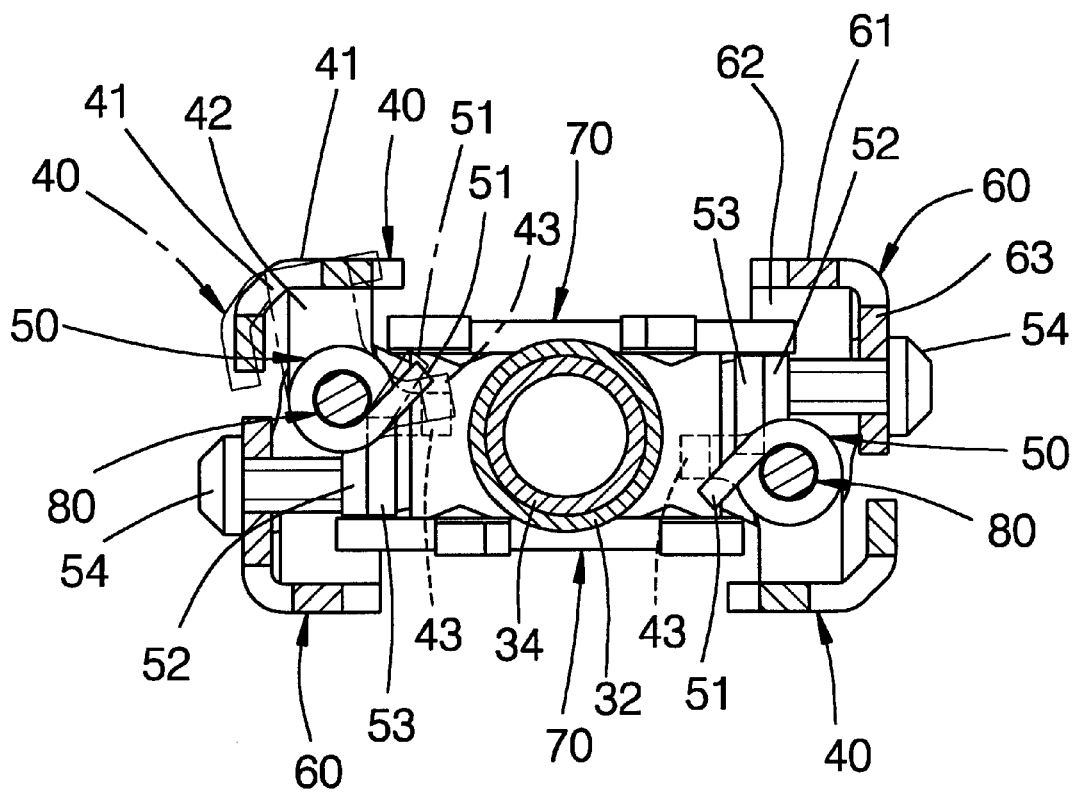
FIG. 7 is a sectional view of the preferred embodiment taken along line 7—7 in FIG. 6, illustrating how the preferred embodiment engages a cleat unit.

Referring to FIG. 7, each of the restriction members 70 can be formed as an elongated plate with opposite ends that restrict the biasing force adjusting members 53 from rotation such that the hollow space 33 is defined between the tubular portion 32 and the forward or rearward anchor members 60, 40 in the longitudinal direction and is not covered by the intermediate portion 71. Thus, dirt attached to the cleat unit (not shown) can drop through the hollow space 33 when the cleat unit is anchored between the forward and rearward anchor members 60, 40. The object of this invention is accordingly achieved.

With this invention thus explained, it is apparent that numerous modifications and variations can be made without departing from the scope and spirit of this invention. It is therefore intended that this invention be limited only as indicated in the appended claims.

I claim:

1. A bicycle pedal assembly adapted to be mounted on a bicycle pedal shaft and adapted to engage a cleat unit which has a forward and rearward ends and which is fixed to a bottom surface of a sole of a cyclist's shoe, the bicycle pedal assembly comprising:

a one-piece pedal body including:

a tubular portion adapted to be mounted rotatably on the bicycle pedal shaft around a first axis, and having front and rear end walls in a longitudinal direction parallel to said first axis, and right and left pairs of front and rear lateral walls extending respectively from said front and rear end walls rightward and leftward in a first transverse direction relative to said longitudinal direction to form rightmost and leftmost pairs of front and rear end portions, respectively, said front and rear end portions being respectively disposed to be spaced apart from each other in said longitudinal direction, each of said lateral walls having upper and lower surfaces opposite to each other in a second transverse direction relative to both said first transverse and longitudinal direction;

two forward anchor members respectively and detachably mounted between said rightmost front and rear end portions in said longitudinal direction and proximate to said upper surfaces thereof, and between said leftmost front and rear end portions in said longitudinal direction and proximate to said lower surfaces thereof such that said forward anchor members are in symmetry relative to said first axis;

two rearward anchor members respectively mounted between said leftmost front and rear end portions in said longitudinal direction and proximate to said upper surfaces thereof, and between said rightmost front and rear end portions in said longitudinal direction and proximate to said lower surfaces thereof such that said rearward anchor members are in symmetry relative to said first axis;

two biasing force adjusting members respectively disposed between said right pair of front and rear lateral walls in said longitudinal direction and proximate said upper surfaces thereof, and between said left pair of front and rear lateral walls in said longitudinal direction and proximate to said lower surfaces thereof and inboard to said forward anchor members, respectively;

two adjustment bolts threadedly inserted in said firs transverse direction through said forward anchor members and fastened threadedly to said biasing force adjusting members;

each of said rearward anchor members including a grip portion projecting uprightly to an elevation beyond one of said upper and lower surfaces, a spring rest member spaced from said grip portion, and an axle mounted between respectively ones of said left and right pairs of front and rear lateral walls in said longitudinal direction for mounting said grip portion pivotally thereon such that said axle is disposed proximate to a respective one of said biasing force adjusting members;

left and right coil springs sleeved around said axles of said rearward anchor members respectively and spaced from said tubular portion in said first transverse direction, each of said coil springs having a first end urging said spring rest member of a respective one of said rearward anchor members to move said grip portion toward a corresponding one of said forward anchor members so as to be adapted to clamp the cleat unit in said first transverse direction in cooperation with the corresponding one of said forward anchor members, and a second end urging a respective one of said biasing force adjusting members in said first transverse direction toward said tubular portion such that rotation of said adjustment bolts relative to said biasing force adjusting members will vary a distance therebetween, thereby resulting in variable biasing force of said coil springs;

wherein the tubular portion, at least one of the lateral walls, and at least one of the forward anchor members define a hollow space; and upper and lower restriction members disposed on upper and lower surfaces of said tubular portion in said first transverse direction, the restriction members being separate from the forward anchor members, each of said restriction members having an intermediate portion disposed securely on said tubular portion, and left and right ends projecting leftward and rightward from said intermediate portion and beyond said tubular portion to depress and thereby restricting said left and right biasing force adjusting members to rotate concurrently with said adjustment bolts.

2. The bicycle pedal assembly as defined in claim 1, wherein said tubular portion is formed with upper and lower accommodating recesses for receiving said intermediate portions of said upper and lower restriction members.

3. The bicycle pedal assembly as defined in claim 1, wherein the hollow space is further defined by at least one of the upper and the lower restriction members.

* * * * *